Patented Mar. 18, 1952

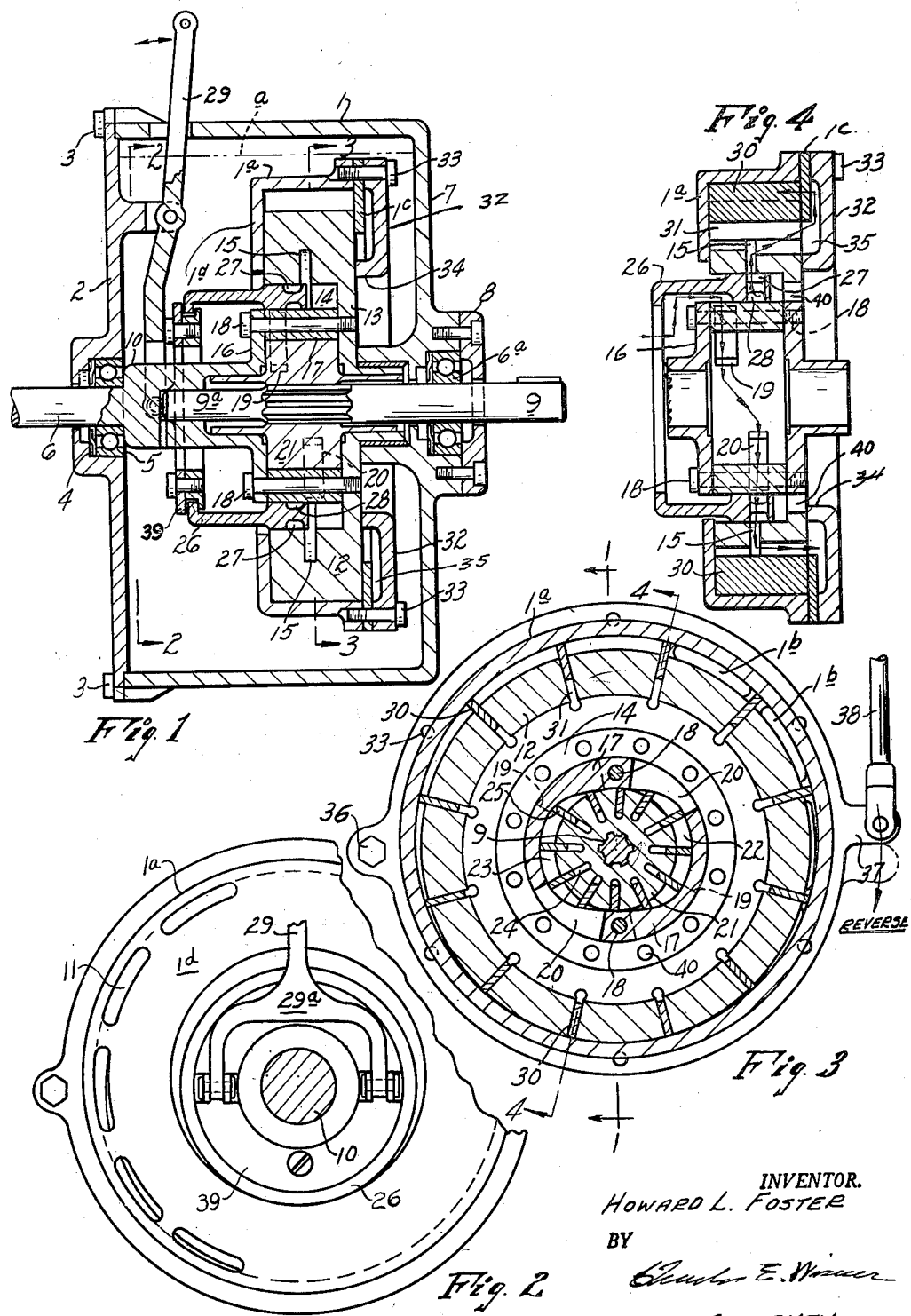

2,589,362

UNITED STATES PATENT OFFICE 2,589,362

HYDRAULIC COUPLING FOR USE BETWEEN A DRIVING AND A DRIVEN ELEMENT

Howard L. Foster, Detroit, Mich.

Application October 30, 1947, Serial No. 783,118

4 Claims. (Cl. 60—53)

This invention relates to a hydraulic coupling for use between a driving and a driven element, the object being to provide a new and improved character and relationship of parts whereby the driving element may be rotated at constant speed and the driven element be rotated at varying speeds as may be required in the performance of work, manually controlled means being provided to control the speed of revolution of the driven shaft.

More specifically the invention includes a control means whereby fluid, such as oil, in a receptacle may be circulated through inlet ports and thence through outlet ports, channels and recesses and thence back into the reservoir or receptacle and in so doing rotates the driven shaft at varying speeds relative to the speed of the driving shaft and thus dispenses with the use of speed reducing gear trains and clutches as is the common practice, or whereby the driven shaft may be caused to rotate at the same speed as the driving shaft without circulation of fluid.

By my improved apparatus the speed of revolution of the driven shaft may be varied from the speed of revolution of the driving shaft uniformly whereas, in the usual transmission mechanism utilizing gears, the variation in speed is step by step and not gradual and uniform as is attained by my improved speed changing apparatus.

A further object of this invention is to provide such a relationship of parts that the power of the driving element may be utilized as an hydraulic power brake to control and reduce the speed of the driven element and thus dispense with the use of friction service brakes as is the common practice.

These and other features and objects of the invention are hereinafter more fully described and claimed and the preferred structural arrangement of the hydraulic coupling embodying my invention is shown in the accompanying drawing in which—

Fig. 1 is a vertical section taken on line 1—1 of Fig. 3 showing my improved apparatus.

Fig. 2 is a view taken on line 2—2 of Fig. 1 showing the means utilized to vary the speed of the driven shaft.

Fig. 3 is a section taken on line 3—3 of Fig. 1 showing the mechanism for causing circulation of fluid and rotation of the driven shaft.

Fig. 4 is a section taken on line 4—4 of Fig. 3 showing one path of flow of the fluid from the receptacle through the transmission apparatus to return to the receptacle.

The invention in the preferred structural form comprises a fixed casing 1 preferably of metal and circular in form. The casing has a detachable end cover 2 secured thereto on one side as by means of bolts 3 and has a recess 4 to receive the ball bearing 5 in which the driven shaft 6 is supported. The opposite side of the casing has a similar bearing 6a provided within a recess formed in the side wall 7 of the outer casing and a cap 8 is centrally apertured through which the shaft 9 extends. The shaft 9 has an inner end 9a seating in the recess provided in the enlarged end 10 of the shaft 6. The said enlarged end 10 has a peripheral flange 16 at a right angle to the shaft 6.

The rotor 12 has a cylindrical rim and has an inwardly extending flange 13 on one side of less width than the width of the rim thereby providing a central recess 14 having its inner face provided with a peripheral groove 15. The enlarged end 10 of the shaft 6 has a flange 16 and a ring 17 is secured between the flanges 13 and 16 by means of the bolts 18 and has two openings 19 and two openings 20 on diametrically opposite sides thereof, respectively.

The inner surface of the ring 17 is oval in form as indicated in Fig. 3 and within the ring is a rotor 21 of cylindrical form in line contact with diametrically opposite sides of the ring 17 and thus provides recesses 22 and 23 on diametrically opposite sides of the rotor 21. The rotor 21 is provided with radial slots 24 in its peripheral wall and a blade 25 is positioned in each of the said slots.

The peripheral wall of the casing 1a housing the rotor 12 is below the liquid level in the outer casing 1 as indicated by dotted lines a in Fig. 1 and thus the rotor is wholly immersed in the liquid in the chamber 1. A flow control device consists of a cylindrical element 26 having a peripheral flange at its inner peripheral edge which has a groove 27 in its outer surface and a similar groove 28 in its inner surface, said grooves being inter-connected by spaced openings as shown in Fig. 4. The member 26 is movable into or out of the recess 14 in the rotor by means of a pivoted lever 29.

The two rotary members 12 and 21 each have radial blades and slots in which the blades are movable during rotation thereof. The rotor 21 is cylindrical in form and is centrally disposed in the oval ring providing recess 22 and 23 on opposite sides thereof. The member 21 is keyed to the driving shaft 9 as will be understood from Fig. 3. The side wall 1c of the rotor housing 1a has apertures 1b in one side thereof and the side wall 1d has apertures 11 as shown in Fig. 2. A plate 32 of ring like form is secured over the side wall 1c by bolts 33. The plate 32 has an inturned edge 34 that engages the outer face of the rotor 12 and thus provides an annular recess 35 open to the interior of the casing 1a through apertures 1b.

When the control member 26 is in the position shown in Fig. 1 the inlet ports 19 are closed and the outlet ports 20 are open to the recess 14 in one side of the rotary member which in turn is open to the fluid in the chamber 1 through the apertures 40 in the flange 13. On movement of the control element 26 to the right from the position shown in Fig. 1, by means of the pivoted lever 29 a sufficient distance to partly uncover the inlet ports 19, fluid is circulated by the rotor 21, entering the recesses 22 and 23 from the chamber 1 through the inlet ports 19 and discharging therefrom through the outlet ports 20 into the recess 14 and thence through apertures 40 and back into the reservoir or chamber 1. The parts are thus in neutral position, applying insufficient pressure on the blades of rotary member 12 to cause the rotor 12 and the driven shaft 6 bolted thereto to rotate. The rotor 12 has a series of radially disposed blades 30 which ride in slots 31 provided therefor in the cylindrical rim of rotor 12 as shown in Fig. 3.

The control element 26 may be moved by the lever 29 to so position the channels 27 and 28 that the groove 15 in the inner wall of the rotor rim is aligned with channel 27 and the outlet ports 20 in the ring 17 are aligned with channel 28. This relationship of parts is shown in Fig. 4 wherein the control element 26 is in the position shown with its peripheral edge entering recess 14 and blocking circulation of fluid to the chamber 1 through aperture 40.

The rotor 21 is not shown in Fig. 4 in order that the path of flow of the liquid will be understood, the line having arrows indicating the direction of flow. The liquid will flow from the interior of the container into the control element 26 and when the element 26 is in the position shown in Fig. 4 the liquid, preferably oil, may pass through the ports 19 and 20 and into the space 35 and thence through apertures 1b to between adjacent blades 30.

By rotation of the shaft 9 the rotor 21 secured thereto is rotated forcing oil to the blades 30 of the rotor 12 through the apertures 1b on one side of the device as shown in Fig. 3. As the rotor 21 is turned in a counter-clockwise direction, oil enters the space between the blades from the inlet ports 19 and is carried therebetween to the outlet ports 20 against any pressure caused by restriction of flow beyond the outlet ports.

Referring to the direction of flow indicated in Fig. 4 oil directed to the groove 15 impinges upon the inner edge of blades 30, forcing them radially outward to contact the peripheral wall of casing 1a, thence into the annular recess 35 and through the apertures 1b to enter the adjacent spaces between the blades 30 which block further flow and cause a pressure to be built up proportional to the power input of the driving shaft 9.

The casing 1a is pivoted at 36 to a side of the outer casing 1 and the casing on the opposite side is provided with a lug 37 to which is connected an arm 38 by which the casing 1a may be turned on the axis of the pivot pin 36.

With the casing 1a positioned as shown in Fig. 3, and the spaces between the blades 30 to the left open to the chamber 1 through apertures 11, the pressure communicated to the blades through the apertures 1b operates to rotate the rotor 12 and the driven shaft 6 secured thereto in the direction of rotation of the driving shaft 9, and at a speed that is inversely proportional to the ratio of the volumetric capacity of the rotary member 12 to that of the rotary member 21. It is to be noted that the hydraulic "gear-ratio" thus developed may be predetermined and that my improved apparatus functions as a transmission mechanism utilizing a fluid in place of the usual gear train.

When the control member 38 is lowered to the reverse position as indicated by the arrow in Fig. 3, the casing 1a is rotated downward about the pivot 36 to contact with the upper surface of the rotor 12 and the driven shaft 6 is caused to rotate in a direction reverse to that of the driving shaft 9.

The speed of rotation of the driven shaft may be varied by means of the lever 29 which has a yoke end 29a pivotally connected with the cylindrical element 26 through the ring bearing members 39 as shown clearly in Figs. 1 and 2 and by movement thereof the ports 19 and 20 in the ring 17 may be functionally controlled. In the position of the control element 26 shown in Fig. 1 the inlet ports 19 are closed and the outlet ports 20 are open to the groove 15 and the recess 14. By moving the control member 26 to the right from the neutral position heretofore described and toward the position shown in Fig. 4, the channel 27 is opened to the groove 15 and the peripheral edge of the control element 26, in approaching the edge of the recess 14, tends to restrict the flow of the liquid into the recess 14, building up pressure and diverting part of the flow into the groove 15 and thence to the blades 30 to initiate rotation of the driven shaft as heretofore described. Thus, by shifting the lever 29 from the neutral position of the parts (wherein the shaft 6 is idle) liquid may flow from the container 1 and will pass through the ports 19 and 20 and into the space between the blades 30 of the rotor 12 in variable and controllable amount to vary the speed of rotation of the driven shaft, either forward or reverse, from zero up to a speed determined by the speed of the driving shaft 9 and the hydraulic gear-ratio of the rotors 12 and 21.

By moving the control member further to the right from the position shown in Fig. 4, the edge of the channel 27 in the member 26 tends to gradually restrict the flow of the liquid into the groove 15 increasing the pressure at the outlet ports 20 sufficient to couple the rotor 21 with the ring 17 and gradually increase the speed of rotation of the driven shaft 6 to that of the driving shaft 9 at which time the flow of liquid to the groove 15 is shut off and an hydraulic lock attained between the ring 17 and rotor 21.

As the speed of rotation of the driven shaft 6 secured to the rotor 12 increases, the volume of flow of liquid per revolution to the spaces between the blades 30 is reduced and causes a reduced pressure in the annular recess 35 and under the blades 30 to automatically retract the blades into the slots 31 in the rotor 12 and out of contact with the peripheral wall of casing 1a, thus eliminating wear of blades and casing when the apparatus is functioning as a direct drive.

It is to be noted that when my improved apparatus is in the condition of direct drive with the control member 26 positioned to the right, the inlet ports 19 are open to replenish any leakage past the blades 25 or the outlet ports 20 and so maintain the hydraulic lock and, particularly, that in this condition there is no circulation of fluid to generate heat or otherwise cause deterioration of the fluid.

When the control member 26 is moved back to the position shown in Fig. 4 during rotation of the driven shaft 6, and the control member 38 is lowered toward mid-position, power may be applied to the driving shaft 9 to establish circulation through the grooves 15 to impinge upon the inner edge of blades 30 and force them radially outward to contact the peripheral wall of casing 1a, the direction of flow of oil being as indicated in Fig. 4. The oil is circulated to the annular recess 35, thence through apertures 1b into the casing 1a, is carried to apertures 11 by rotation of rotor 12 and discharged into the chamber 1. Upon further movement of the control member 38 toward reverse position, oil discharge from the casing 1a is increasingly restricted causing pressure to be built up which acts on the blades 30 to oppose rotation of the shaft 6. This relationship of parts functions as a power brake up to the power capacity of the driving shaft 9. Should sufficient pressure be built up to overcome the power output of the driving shaft 9, movement of the control member 26 to the extreme right will result in an hydraulic lock between the casing 1a and the rotor 12.

Various other functional relationships may be obtained by manipulation of the control members. For example if, with both driving and driven shafts at a standstill and the control member 26 in the position shown in Fig. 1, the shaft 6 is rotated forward by any exterior means, the shaft 9 is forced to rotate therewith because of the hydraulic lock between the ring 17 and the rotor 21 due to ports 19 being closed. This condition may be utilized to start an engine connected to the driving shaft 9.

As another example: if, with both shafts directly coupled and the control member 26 to the extreme right of the position shown in Fig. 4, power is released from the driving shaft 9, the driven shaft 6 will now overrun the driving shaft 9 breaking the hydraulic lock between the ring 17 and the rotor 21 and resulting in direct drive free-wheeling with some drag on the driving shaft 9 due to the vacuum formed in the recesses 22 and 23. This drag may be eliminated by moving the control member to the position shown in Fig. 4, whereby oil is circulated from the chamber or reservoir 1 back through the apertures 11 into the casing 1a, thence through apertures 1b into the annular recess 35, groove 15 and through ports 20 into the recesses 22 and 23 to be discharged through the ports 19 into the chamber 1. The blades 30 remain retracted into the slots 31 by the partial vacuum in the groove 15. If the control member 26 is now moved to the position shown in Fig. 1, the ports 19 are closed forcing the shaft 9 to rotate with the shaft 6 because of the hydraulic lock between the ring 17 and the rotor 21, and the relationship of parts is such that the engine connected to the shaft 9 is utilized as an engine compression brake. Other functional relationships may be perceived by those skilled in the art.

The apparatus is comparatively simple in construction and avoids the meshing of gears as in the ordinary automobile transmission mechanism and variation in speed by my improved device is accomplished without any noticeable shock or jar as may be the case with the usual gear train of a mechanical transmission.

It is believed obvious from the drawing and foregoing description that the various objects and features of the invention are attained by the structural arrangement and relationship of the parts as described.

Having thus fully described my invention, its utility and mode of operation, what I claim and desire to secure by Letters Patent of the United States is:

1. A coupling for use between axially aligned rotatable drive and driven shafts comprising an outer casing containing a fluid, the opposed end walls of said casing having openings through which the respective shafts extend, a rotor having radially extendible and retractable blades secured to said drive shaft, a housing therefor having longitudinally spaced diametrically opposed inlets and diametrically opposed outlets through which the fluid from said casing may pass to and from said rotor, the internal periphery of said housing being oval in form and the rotor having a cylindrical periphery of a diameter approximately equal to the short diameter of the oval opening in said housing, whereby fluid between the blades drawn from said inlets is placed under pressure during rotation of said rotor, a second rotor of greater diameter than the first rotor secured to said driven shaft and joined to said housing, the second rotor having radially extendible and retractable blades, an inner casing for said second rotor, the two rotors having a common axis eccentric to the axis of said inner casing, so that said second rotor contacts said inner casing on one side, said inner casing having apertures in its side wall through which fluid under pressure may pass from said housing outlets to operatively engage said second rotor blades whereby said second rotor is driven, said inner casing being pivotally mounted within and upon said outer casing for varying the eccentric relation of said inner casing relative to said rotors whereby the volume of flow of fluid per revolution of said first rotor is varied.

2. A coupling for use between axially aligned rotatable drive and driven shafts comprising an outer casing containing a fluid, said shafts extending outwardly of each of the opposite ends of said casing, a rotor on said drive shaft, a housing for said rotor connected to said driven shaft and having diametrically opposed inlet ports and longitudinally spaced diametrically opposed outlet ports, said housing being shaped on its interior to provide an elliptical chamber, said rotor being of cylindrical form and positioned within said chamber, said rotor having a series of radial slots opening through the outer face thereof, a series of blades positioned in the slots, the blades being extendible by rotation of said rotor to contact the inner wall of said chamber whereby through rotation of the rotor fluid is drawn into said housing through said inlet ports and discharged under pressure through said outlet ports, an inner casing pivotally mounted upon and within said outer casing, a second rotor secured upon said driven shaft and positioned within said inner casing, said second rotor having passageways in cooperation with the wall of said inner casing for delivering pressure fluid from said outlet ports to the outer periphery of said driven rotor within said inner casing, and manually controlled valve means on said housing and arranged between said outlet ports and said passageways for varying the volume of flow of fluid to said second rotor.

3. A coupling for use between rotatable drive and driven shaft comprising an outer casing containing a fluid, said shafts having end portions extending into and supported by said casing in axial alignment, a rotor secured on the drive shaft, a housing for said rotor secured to said driven shaft, said housing having oppositely disposed apertures in its periphery and being formed to provide an inner oval shaped chamber, said rotor being cylindrical in form and of a diameter equal to the short diameter of said chamber thereby providing a space on each side of said rotor within said chamber, said rotor having radial slots, blades slidable in said slots and engageable with the inner surface of said chamber, a second rotor positioned over said first rotor and joined to said driven shaft, said second rotor also having radially movable blades, an inner casing for said rotors pivotally mounted on one side upon and within said outer casing, means for turning said inner casing on its pivot to contact one side of said second rotor, said casing having slots in one side and being movable on its pivot to position its axis eccentric to the axis of said rotors whereby the direction of rotation of said second rotor may be reversed, and valve means on said housing registerable with its apertures to vary the volume of flow of fluid from the outer casing and through said slots for operative engagement with the blades of said second rotor for driving the same within said inner casing.

4. A coupling for use between rotatable drive and driven shafts, a rotary impeller fixed to said drive shaft, a housing for said impeller joined to said driven shaft, a second rotary impeller fixed to said driven shaft, said housing having longitudinally spaced fluid inlet and discharge openings, a chambered member containing a fluid in which said impellers are submerged, a manually operable control element of cylindrical form and including an annular flange movable upon the outer surface of said housing for registry with said discharge openings, said flange having interconnected grooves in its inner and its outer surfaces adjacent the end thereof in concentric relation, the position of the grooves relative to said discharge openings determining the volume of fluid transferred from the first to the second impeller per revolution of said first impeller, and a lever pivotally mounted on said chambered member and joined to said control element for adjustably sliding the same upon said housing.

HOWARD L. FOSTER.

REFERENCES CITED

The following references are of record in the file of this patent:

UNITED STATES PATENTS

| Number | Name | Date |
|---|---|---|
| 1,497,741 | Schneider | June 17, 1924 |
| 1,797,439 | Napier | Mar. 24, 1931 |
| 1,998,922 | Chamberlain | Apr. 23, 1935 |

FOREIGN PATENTS

| Number | Country | Date |
|---|---|---|
| 470,741 | France | June 23, 1914 |